(12) United States Patent
Jiang et al.

(10) Patent No.: US 11,248,117 B2
(45) Date of Patent: Feb. 15, 2022

(54) FLUORINATED ELASTOMERS CURED BY ACTINIC RADIATION AND METHODS THEREOF

(71) Applicant: 3M INNOVATIVE PROPERTIES COMPANY, St. Paul, MN (US)

(72) Inventors: Xuan Jiang, Shanghai (CN); Jeffrey N. Bartow, West St. Paul, MN (US); Robert J. DeVoe, Minnetonka, MN (US); Tatsuo Fukushi, Woodbury, MN (US); Klaus Hintzer, Kastl (DE); Tho Q. Nguyen, Bloomington, MN (US); Sheng Ye, Redmond, WA (US); Fee Zentis, Waging am See (DE)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 16/629,429

(22) PCT Filed: Jul. 17, 2018

(86) PCT No.: PCT/US2018/042414
§ 371 (c)(1),
(2) Date: Jan. 8, 2020

(87) PCT Pub. No.: WO2019/018352
PCT Pub. Date: Jan. 24, 2019

(65) Prior Publication Data
US 2020/0181387 A1    Jun. 11, 2020

Related U.S. Application Data

(60) Provisional application No. 62/534,852, filed on Jul. 20, 2017.

(51) Int. Cl.
| | | |
|---|---|---|
| C08L 27/20 | (2006.01) | |
| B29C 35/08 | (2006.01) | |
| C08F 214/22 | (2006.01) | |
| C08K 5/14 | (2006.01) | |
| C08K 5/357 | (2006.01) | |

(52) U.S. Cl.
CPC .......... *C08L 27/20* (2013.01); *B29C 35/0805* (2013.01); *C08F 214/22* (2013.01); *C08K 5/14* (2013.01); *C08K 5/357* (2013.01); *B29C 2035/0833* (2013.01); *B29K 2995/0039* (2013.01); *C08F 2800/20* (2013.01); *C08F 2810/20* (2013.01); *C08L 2205/025* (2013.01); *C08L 2205/03* (2013.01); *C08L 2312/00* (2013.01)

(58) Field of Classification Search
CPC ............ C08L 2312/00; C08L 2205/03; C08L 2205/025; C08L 5/357; C08L 5/14; C08L 5/0025; C08F 2800/20; C08F 2801/20; C08F 214/22; B29K 2995/0039; B29C 2035/0833; B29C 35/0805

USPC .......................................................... 522/155
See application file for complete search history.

(56) References Cited

U.S. PATENT DOCUMENTS

| | | |
|---|---|---|
| 3,718,558 A | 2/1973 | Tabata |
| 3,729,313 A | 4/1973 | Smith |
| 3,741,769 A | 6/1973 | Smith |
| 3,808,006 A | 4/1974 | Smith |
| 4,250,053 A | 2/1981 | Smith |
| 4,394,403 A | 7/1983 | Smith |
| 5,169,902 A | 12/1992 | Yagi |
| 5,225,504 A | 7/1993 | Tatsu |
| 5,545,676 A | 8/1996 | Palazzotto |
| 6,506,460 B1 | 1/2003 | Paglia |
| 6,803,391 B2 | 10/2004 | Paglia |
| 7,553,543 B2* | 6/2009 | Bekiarian .......... C08K 5/34924 427/162 |
| RE41,896 E | 10/2010 | Paglia |
| 8,394,870 B2 | 3/2013 | Hung |
| 9,856,340 B2 | 1/2018 | Saito |
| 2008/0032052 A1 | 2/2008 | Kourtakis |
| 2011/0015359 A1 | 1/2011 | Hung |
| 2013/0158154 A1 | 6/2013 | Lyons |
| 2014/0050841 A1 | 2/2014 | Greene |
| 2017/0002153 A1 | 1/2017 | Osumi |

FOREIGN PATENT DOCUMENTS

| | | |
|---|---|---|
| CN | 101331409 | 12/2008 |
| CN | 101916816 | 12/2010 |
| CN | 102482473 | 5/2012 |
| CN | 106675359 | 5/2017 |
| EP | 0570254 | 11/1993 |
| EP | 3333229 | 6/2018 |
| FR | 2129769 | 10/1972 |
| GB | 1390677 | 4/1975 |
| JP | S61-031411 | 2/1986 |
| JP | H05-078539 | 3/1993 |
| JP | H05-302058 | 11/1993 |
| JP | H11-302394 | 11/1999 |
| WO | WO 2008-019078 | 2/2008 |
| WO | WO 2010-147815 | 12/2010 |
| WO | WO 2011-035258 | 3/2011 |
| WO | WO 2015-127572 | 9/2015 |
| WO | WO 2016-071241 | 5/2016 |

(Continued)

OTHER PUBLICATIONS

International Search Report for PCT International Application No. PCT/US2018/065960, dated Apr. 3, 2019, 4 pages.

(Continued)

*Primary Examiner* — Sanza L. McClendon
(74) *Attorney, Agent, or Firm* — Julie Lapos-Kuchar

(57) ABSTRACT

Described herein is a curable composition comprising an amorphous fluoropolymer having an iodine, bromine and/or nitrile cure site; a peroxide cure system comprising a peroxide and a Type II coagent; and a photoinitiator, wherein the curable composition is substantially free of a binder material. Also described herein, are methods of curing the curable composition using actinic radiation and articles thereof.

20 Claims, No Drawings

(56) References Cited

FOREIGN PATENT DOCUMENTS

| WO | WO 2017-014174 | 1/2017 |
| WO | WO 2017-112653 | 6/2017 |
| WO | WO 2017-127561 | 7/2017 |
| WO | WO 2017-127569 | 7/2017 |
| WO | WO 2019-016739 | 1/2019 |
| WO | WO 2019-018352 | 1/2019 |
| WO | WO 2019-126016 | 6/2019 |

OTHER PUBLICATIONS

International Search Report for PCT International Application No. PCT/US2018/042414, dated Oct. 10, 2018, 4 pages.

\* cited by examiner

FLUORINATED ELASTOMERS CURED BY ACTINIC RADIATION AND METHODS THEREOF

CROSS REFERENCE TO RELATED APPLICATIONS

This application is a national stage filing under 35 U.S.C. 371 of PCT/US2018/042414, filed Jul. 17, 2018, which claims the benefit of U.S. Application No. 62/534852, filed Jul. 20, 2017, the disclosure of which is incorporated by reference in its/their entirety herein.

TECHNICAL FIELD

The present disclosure relates to a composition comprising an amorphous fluoropolymer, which is at least partially cured using actinic radiation. Methods of making the fluorinated elastomer and cured fluoroelastomer articles are disclosed herein.

SUMMARY

Fluoropolymers are widely used as raw materials for their chemical inertness, in particular for articles requiring low friction properties and/or inertness to chemical reactivity, heat, or both. Fluoropolymers are typically classified into thermoplastics, non-melt processable fluoropolymers and elastomers (sometimes also referred to as fluororubbers).

Peroxide cured fluorinated elastomers are known for their improved steam and chemical resistance as compared to partially fluorinated elastomers cured using other cure systems such as bisphenol or triazine. When curable compositions comprising an amorphous fluoropolymer and a peroxide curing system are thinly coated onto a substrate and thermally cured, it has been found that the coating is not sufficiently cured. Thus, it is desirable to identify a peroxide cured fluoroelastomer that is sufficiently cured when coated as a thin layer.

Recently, shaped fluoroelastomeric articles have been made using printing techniques. An amorphous fluoropolymer along with a binder material is printed into a shape. During printing, the binder material (such as a wax, polymerizable acrylate, or polymerizable methacrylate) is reacted such that the binder material solidifies or gels to form a green body. The green body comprises a scaffolding of reacted binder material, which supports particles of amorphous fluoropolymer. The green body is then treated to cure the amorphous fluoropolymer and remove the binder material. The binder material gives the green body sufficient dimensional stability throughout the creation of the created object. However, the binder material is not responsible for the dimensional stability of the finished article and can be removed without the finished article becoming dimensionally unstable. Often, the removal of the binder material can create voids in the finished article. Further, if heat is used to remove the binder material, the cured fluoroelastomer must be able to withstand the heat treatment. Thus, alternatively or additionally, it is desirable to identify a method of making a shaped fluoroelastomer article, wherein the shaped fluoroelastomer article has a negligible void volume and/or is not exposed to sufficiently high temperatures.

In one aspect, a curable composition and partially curing the curable composition is disclosed. The curable composition comprising:

(a) an amorphous fluoropolymer having an iodine, bromine and/or nitrile cure site;

(b) a peroxide cure system comprising a peroxide and a Type II coagent; and (c) a photoinitiator, wherein the curable composition is substantially free of a binder material.

In one aspect, a method of curing an amorphous fluoropolymer with ultraviolet (UV) light is disclosed.

In one aspect, a method of dual curing an amorphous fluoropolymer is disclosed, wherein a curable composition is exposed to actinic radiation, followed by exposure to a heat source.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"interpolymerized" refers to monomers that are polymerized together to form a polymer backbone;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain atoms other than fluorine and carbon atoms, like oxygen atoms, chlorine atoms, bromine atoms and iodine atoms; and "polymer" refers to a macrostructure having a number average molecular weight (Mn) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Contrary to the use of "consisting", the use of words such as "including," "containing", "comprising," or "having" and variations thereof is meant to encompass the items listed thereafter and equivalents thereof as well as additional items.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Disclosed herein is a curable fluoropolymer composition. This curable fluoropolymer composition is at least partially cured by exposure to actinic radiation. In one embodiment, the curable fluoropolymer composition is substantially cured via actinic radiation. In another embodiment, the curable fluoropolymer composition is first partially cured via actinic radiation and then subsequently cured via a thermal treatment.

Curable Composition

The curable fluoropolymer composition of the present disclosure comprises an amorphous fluoropolymer; a peroxide; a Type II coagent; and a photoinitiator system. The curable fluoropolymer composition of the present disclosure is also substantially free of a binder material.

Amorphous Fluoropolymer

The fluoropolymers of the present disclosure are amorphous, meaning that there is an absence of long-range order (i.e., in long-range order the arrangement and orientation of the macromolecules beyond their nearest neighbors is understood). The amorphous polymer has no detectable crystalline character by DSC (differential scanning calorimetry). If studied under DSC, the fluoropolymer would have no melting point or melt transitions with an enthalpy more than 0.002, 0.01, 0.1, or even 1 Joule/g from the second heat of a heat/cool/heat cycle, when tested using a DSC thermogram with a first heat cycle starting at −85° C. and ramped at 10° C./min to 350° C., cooling to −85° C. at a rate of 10° C./min and a second heat cycle starting from −85° C. and ramped at 10° C./min to 350° C.

In one embodiment, the amorphous fluoropolymers of the present disclosure decompose above a temperature of 350, 325, 300, or even 275° C.

The amorphous fluoropolymers of the present disclosure may be perfluorinated or partially fluorinated. A perfluorinated amorphous polymer comprises C—F bonds and no C—H bonds along the carbon backbone of the polymer chain, however, the terminal ends of the polymer, where the polymerization was initiator or terminated, may comprise C—H bonds. A partially fluorinated amorphous polymer comprises both C—F and C—H bonds along the carbon backbone of the polymer chain.

In one embodiment, the amorphous fluoropolymer of the present disclosure comprises at least 30%, 50%, 55%, 58%, or even 60% by weight of fluorine, and no more than 65, 70, or even 72% by weight of fluorine (based on the total weight of the amorphous fluoropolymer).

In one embodiment, the amorphous fluoropolymer is perfluorinated and comprises at least 73, 74, or even 75% by weight of fluorine based on the total weight of the amorphous fluoropolymer.

In one embodiment, the amorphous fluoropolymer is derived from at least one hydrogen-containing monomer and at least one fluorine-containing monomer. In one embodiment, the amorphous fluoropolymer is derived from a monomer comprising both a olefinic hydrogen and an olefinic fluorine, such as vinylidene fluoride. Hydrogen containing monomers include those known in the art. The hydrogen-containing monomers may or may not contain fluorine atoms. Exemplary hydrogen-containing monomers include: vinylidene fluoride, pentafluoropropylene (e.g., 2-hydropentafluoropropylene), vinyl fluoride, trifluoroethylene, propylene, ethylene, isobutylene, and combinations thereof. Fluorine-containing monomers include those known in the art. Exemplary fluorine-containing monomers include: hexafluoropropene, tetrafluoroethylene, chlorotrifluoroethylene, perfluoro(alkylvinyl ether) (such as perfluoromethyl vinyl ether, $CF_2$=$CFOCFCF_2CF_2OCF_3$, $CF_2$=$CFOCF_2OCF_2CF_3$, $CF_2$=$CFOCF_2OCF_2CF_3$, and $CF_2$=$CFOCF_2OCF_3$), and combinations thereof.

In one embodiment, the amorphous fluoropolymer comprises at least one of a carbon-carbon double bond, or a unit capable of forming carbon-carbon double bonds along the amorphous fluoropolymer chain.

In one embodiment, the amorphous fluoropolymer comprises interpolymerized units derived from vinylidene fluoride (VDF). In one embodiment, the amorphous fluoropolymer is derived from 25-65 wt % VDF or even 35-60 wt % VDF.

In one embodiment, the amorphous fluoropolymer comprises interpolymerized units derived from (i) hexafluoropropylene (HFP), tetrafluoroethylene (TFE), and vinylidene fluoride (VDF); (ii) HFP and VDF, (iii) VDF and perfluoromethyl vinyl ether (PMVE), (iv) VDF, TFE, and PMVE, (v) VDF, TFE, and propylene, (vi) ethylene, TFE, and PMVE, (vii) TFE, VDF, PMVE, and ethylene, and (viii) TFE, VDF, and $CF_2$=$CFO(CF_2)_3OCF_3$.

In one embodiment, the amorphous fluoropolymer comprises interpolymerized units derived from at least 50, 55, or even 60 wt % and at most 65, 70, or even 75 wt % VDF; and at least 30 or even 35 wt % and at most 40, 45, or even 50 wt % HFP. In one embodiment, the amorphous fluoropolymer comprises interpolymerized units derived from at least 45, 50, 55, or even 60 wt % and at most 65, 70, or even 75 wt % VDF; at least 10, 15, or even 20 wt % and at most 30, 35, 40, or even 45 wt % HFP; and at least 3, 5, or even 7 wt % and at most 10 or even 15 wt % TFE. In one embodiment, the amorphous fluoropolymer comprises interpolymerized units derived from at least 25, 30, or even 35 wt % and at most 40, 45, 50, 55, or even 65 wt % VDF; at least 20, 25, or even 30 wt % and at most 35, 40, or even 45 wt % HFP; and at least 15, 20, or even 25 wt % and at most 30, 35, or even 40 wt % TFE. In one embodiment, the amorphous fluoropolymer comprises interpolymerized units derived from at least 30, 35, 40, or even 45 wt % and at most 55, 60, or even 65 wt % VDF; at least 25, 30, or even 35 wt % and at most 40, 45, 50, 55, 60, or even 65 wt % PMVE; and at least 3, 5, or even 7 wt % and at most 10, 15, or even 20 wt % TFE. In one embodiment, the amorphous fluoropolymer comprises interpolymerized units derived from at least 30, 35, 40, or even 45 wt % and at most 55, 60, or even 65 wt % VDF; at least 10, 15, 20, 25, or even 35 wt % and at most 40, 45, 50, 55, or even 60 wt % PMVE; and at least 10 15, or even 20 wt % and at most 25, 30, or even 35 wt % TFE. In one embodiment, the amorphous fluoropolymer comprises interpolymerized units derived from at least 5, 10, or even 15 wt % and at most 20, 25, or even 30 wt % VDF; at least 5, 10, or even 15 wt % and at most 20, 25, or even 30 wt % propylene; and at least 50, 55, 60, or even 65 wt % and at most 70, 75, 80, or even 85 wt % TFE. In one embodiment, the amorphous fluoropolymer comprises interpolymerized units derived from a perfluorinated ether monomer of the formula $CF_2$=$CF(CF_2)_pO(R_{f1}O)_n(R_{f2}O)_mR_f$ where $R_{f1}$ and $R_{f2}$ are different linear or branched perfluoroalkylene groups containing 2, 3, 4, 5, or 6 carbon atoms; m and n are independently 0, 1, 2, 3, 4, 5, 6, 7, 8, 9, or 10, p is 0 or 1, and $R_f$ is a perfluoroalkyl group of 1, 2, 3, 4, 5, or 6 carbon atoms. Such perfluorinated ether compounds are known in the art and include for example, perfluorinated alkyl vinyl ether such as methyl vinyl ether, perfluorinated alkyl allyl ether such as perfluorinated methyl allyl ether, and perfluorinated alkoxy vinyl ether and perfluorinated alkoxy allyl ether. In one embodiment, the amorphous fluoropolymer comprises interpolymerized units derived from (i) TFE, and PMVE, (ii) TFE and $CF_2$=$CFOC_3F_7$, (iii) TFE, $CF_2$=$CFOCF_3$, and $CF_2$=$CFOC_3F_7$, (iv) TFE and ethyl vinyl ether, (v) TFE and butyl vinyl ether, (vi) TFE, ethyl vinyl ether and butyl vinyl ether, (vii) VDF and $CF_2$=$CF$—$OC_3F_7$, (viii) ethylene and HFP, and (ix) TFE and HFP. In one embodiment, the amorphous perfluorinated elastomer comprises interpolymerized units derived from at least 50, 60, or even 65 wt % and at most 70, 75 or even 80 wt % TFE and at least 20, 25, or even 30 wt % and at most 35, 40, 45, or even 50 wt % of a perfluorinated ether monomer as described above.

The amorphous fluoropolymer of the present disclosure contains cure sites which facilitate cross-linking of the fluoropolymer. These cure sites comprise at least one of I, Br, and CN. The fluoropolymer may be polymerized in the presence of a chain transfer agent and/or cure site monomers to introduce cure sites into the fluoropolymer. Such cure site monomers and chain transfer agents are known in the art. Exemplary chain transfer agents include: an iodo-chain transfer agent, a bromo-chain transfer agent, or a chloro-chain transfer agent. For example, suitable iodo-chain transfer agent in the polymerization include the formula of $RI_x$, where (i) R is a perfluoroalkyl or chloroperfluoroalkyl group having 3 to 12 carbon atoms; and (ii) x=1 or 2. The iodo-chain transfer agent may be a perfluorinated iodo-compound. Exemplary iodo-perfluoro-compounds include 1,3-diiodoperfluoropropane, 1,4-diiodoperfluorobutane, 1,6-diiodoperfluorohexane, 1,8-diiodoperfluorooctane, 1,10-diiodoperfluorodecane, 1,12-diiodoperfluorododecane, 2-iodo-1,2-dichloro-1,1,2-trifluoroethane, 4-iodo-1,2,4-trichloroperfluorobutan, and mixtures thereof. In some embodiments, the iodo-chain transfer agent is of the formula $I(CF_2)_n$—O—$R_f(CF_2)_m$I, wherein n is 1, 2, 3, 4, 5, 6, 7, 8, 9, or 10, m is 1, 2, 3, 4, 5, 6, 7, 8, 9, or 10 and $R_f$ is a partially fluorinated or perfluorinated alkylene segment, which can be linear or branched and optionally comprises at least one catenated ether linkage. Exemplary compounds include: I—$CF_2$—$CF_2$—O—$CF_2$—$CF_2$—I, I—$CF(CF_3)$—$CF_2$—O—$CF_2$—$CF_2$—I, I—$CF_2$—$CF_2$—O—$CF(CF_3)$—$CF_2$—O—$CF_2$—$CF_2$—I, I—$(CF(CF_3)$—$CF_2$—O)$_2$—$CF_2$—$CF_2$—I, I—$CF_2$—$CF_2$—O—$(CF_2)_2$—O—$CF_2$—$CF_2$—I, I—$CF_2$—$CF_2$—O—$(CF_2)_3$—O—$CF_2$—$CF_2$—I, and I—$CF_2$—$CF_2$—O—$(CF_2)_4$—O—$CF_2$—$CF_2$—I, I—$CF_2$—$CF_2$—$CF_2$—O—$CF_2$—$CF_2$—I, and I—$CF_2$—$CF_2$—$CF_2$—O—$CF(CF_3)$—$CF_2$—O—$CF_2$—$CF_2$—I, In some embodiments, the bromine is derived from a brominated chain transfer agent of the formula: $RBr_x$, where (i) R is a perfluoroalkyl or chloroperfluoroalkyl group having 3 to 12 carbon atoms; and (ii) x=1 or 2. The chain transfer agent may be a perfluorinated bromo-compound.

Cure site monomers, if used, comprise at least one of a bromine, iodine, and/or nitrile cure moiety.

In one embodiment, the cure site monomers may be of the formula: $CX_2$=CX(Z), wherein: (i) X each is independently H or F; and (ii) Z is I, Br, $R_f$—U wherein U=I or Br and $R_f$=a perfluorinated or partially perfluorinated alkylene group optionally containing ether linkages. In addition, non-fluorinated bromo- or iodo-olefins, e.g., vinyl iodide and allyl iodide, can be used. Exemplary cure site monomers include: $CH_2$=CHI, $CF_2$=CHI, $CF_2$=CFI, $CH_2$=CHCH$_2$I, $CF_2$=CFCF$_2$I, ICF$_2$CF$_2$CF$_2$CF$_2$I, $CH_2$=CHCF$_2$CF$_2$I, $CF_2$=CFCH$_2$CH$_2$I, $CF_2$=CFCF$_2$CF$_2$I, $CH_2$=CH(CF$_2$)$_6$CH$_2$CH$_2$I, $CF_2$=CFOCF$_2$CF$_2$I, $CF_2$=CFOCF$_2$CF$_2$CF$_2$I, $CF_2$=CFOCF$_2$CF$_2$CH$_2$I, $CF_2$=CFCF$_2$OCH$_2$CH$_2$I, $CF_2$=CFO(CF$_2$)$_3$—OCF$_2$CF$_2$I, $CH_2$=CHBr, $CF_2$=CHBr, $CF_2$=CFBr, $CH_2$=CHCH$_2$Br, $CF_2$=CFCF$_2$Br, $CH_2$=CHCF$_2$CF$_2$Br, $CF_2$=CFOCF$_2$CF$_2$Br, $CF_2$=CFCl, I—$CF_2$—$CF_2CF_2$—O—CF=$CF_2$, I—$CF_2$—$CF_2CF_2$—O—$CF_2CF$=$CF_2$, I—$CF_2$—$CF_2$—O—$CF_2$—CF=$CF_2$, I—$CF(CF_3)$—$CF_2$—O—CF=$CF_2$, I—$CF(CF_3)$—$CF_2$—O—$CF_2$—CF=$CF_2$, I—$CF_2$—$CF_2$—O—$CF(CF_3)$—$CF_2$—O—CF=$CF_2$, I—$CF_2$—$CF_2$—O—$CF(CF_3)$—$CF_2$—O—$CF_2$—CF=$CF_2$, I—$CF_2$—$CF_2$—(O—$CF(CF_3)$—$CF_2$)$_2$—O—CF=$CF_2$, I—$CF_2$—$CF_2$—(O—$CF(CF_3)$—$CF_2$)$_2$—O—$CF_2$—CF=$CF_2$, Br—$CF_2$—$CF_2$—O—$CF_2$—CF=$CF_2$, Br—$CF(CF_3)$—$CF_2$—O—CF=$CF_2$, I—$CF_2$—$CF_2$—$CF_2$—O—$CF(CF_3)$—$CF_2$—O—CF=$CF_2$, I—$CF_2$—$CF_2$—$CF_2$—O—$CF(CF_3)$—$CF_2$—O—$CF_2$—CF=$CF_2$, I—$CF_2$—$CF_2$—$CF_2$—(O—$(CF(CF_3)$—$CF_2)_2$—O—CF=$CF_2$, I—$CF_2$—$CF_2$—$CF_2$—O—$(CF(CF_3)$—$CF_2$—O)$_2$—$CF_2$—CF=$CF_2$, Br—$CF_2$—$CF_2$—$CF_2$—O—CF=$CF_2$, Br—$CF_2$—$CF_2$—$CF_2$—O—$CF_2$—CF=$CF_2$, I—$CF_2$—$CF_2$—O—$(CF_2)_2$—O—CF=$CF_2$, I—$CF_2$—$CF_2$—O—$(CF_2)_3$—O—CF=$CF_2$, I—$CF_2$—$CF_2$—O—$(CF_2)_4$—O—CF=$CF_2$, I—$CF_2$—$CF_2$—O—$(CF_2)_2$—O—$CF_2$—CF=$CF_2$, I—$CF_2$—$CF_2$—O—$(CF_2)_3$—O—$CF_2$—CF=$CF_2$, I—$CF_2$—$CF_2$—O—$(CF_2)_2$—O—$CF(CF_3)$—$CF_2$—O—$CF_2$—CF=$CF_2$, I—$CF_2$—$CF_2$—O—$(CF_2)_2$—O—CF($CF_3$)$CF_2$—O—$CF_2$—CF=$CF_2$, Br—$CF_2$—$CF_2$—O—$(CF_2)_2$—O—CF=$CF_2$, Br—$CF_2$—$CF_2$—O—$(CF_2)_3$—O—CF=$CF_2$, Br—$CF_2$—$CF_2$—O—$(CF_2)_4$—O—CF=$CF_2$, and Br—$CF_2$—$CF_2$—O—$(CF_2)_2$—O—$CF_2$—CF=$CF_2$.

In another embodiment, the cure site monomers comprise nitrile-containing cure moieties. Useful nitrile-containing cure site monomers include nitrile-containing fluorinated olefins and nitrile-containing fluorinated vinyl ethers, such as: perfluoro(8-cyano-5-methyl-3,6-dioxa-1-octene); $CF_2$=CF—O—$(CF_2)_n$—CN where n=2-12, preferably 2, 3, 4, 5, or 6. Examples of a nitrile-containing cure site monomer include $CF_2$=CF—O—[$CF_2$—CFCF$_3$—O]$_n$—$CF_2$—CF(CF$_3$)—CN; where n is 0, 1, 2, 3, or 4, preferably 0, 1, or 2; $CF_2$=CF—[OCF$_2$CF(CF$_3$)]$_x$—O—$(CF_2)_n$—CN; where x is 1 or 2, and n is 1, 2, 3, or 4; and $CF_2$=CF—O—$(CF_2)_n$—O—CF(CF$_3$)CN where n is 2, 3, or 4. Exemplary nitrile-containing cure site monomers include: $CF_2$=CFO(CF$_2$)$_5$CN, $CF_2$=CFOCF$_2$CF(CF$_3$)OCF$_2$CF$_2$CN, $CF_2$=CFOCF$_2$CF(CF$_3$)OCF$_2$CF(CF$_3$)CN, $CF_2$=CFOCF$_2$CF$_2$CF$_2$OCF(CF$_3$)CN, $CF_2$=CFOCF$_2$CF(CF$_3$)OCF$_2$CF$_2$CN; and combinations thereof.

The amorphous fluoropolymer composition of the present disclose comprises iodine, bromine, and/or nitrile cure sites, which are subsequently used to crosslink the amorphous fluoropolymer. In one embodiment, the amorphous fluoropolymer composition of the present disclosure comprises at least 0.1, 0.5, 1, 2, or even 2 wt % of iodine, bromine, and/or nitrile groups versus the total weight of the amorphous fluoropolymer. In one embodiment, the amorphous fluoropolymer of the present disclosure comprises no more than 3, 5, or even 10 wt % of iodine, bromine, and/or nitrile groups versus the total weight of the amorphous fluoropolymer.

In one embodiment, the amorphous fluoropolymer comprising cure sites is blended with a second amorphous fluoropolymer, which may or may not comprise bromine, iodine, and/or nitrile cure sites.

Photoinitiator

The curable compositions of the present disclosure comprise a photoinitiator, which when exposed to actinic radiation causes the composition to at least partially cure. As used herein, partially cured refers to a state that the crosslinking degree in the fluoropolymer is higher than that in an uncross-linked fluoropolymer, which can be observed by an increase in the viscosity of the fluoropolymer.

The photoinitiators of the present disclosure are effective in causing cross-linking of the curable compositions of the present disclosure when exposed to actinic radiation. Such photoinitiators are known in the art and commercially available. Ideally, the photoinitiators are soluble or dispersable in the present composition (e.g., solvent or the amorphous fluoropolymer) to ensure adequate reaction. Two classes of photoinitiator systems are disclosed herein.

A first photoinitiator system comprises a single component, which when exposed to actinic radiation, cleaves forming two radicals. Such photoinitiators are known in the art. Exemplary photoinitiators of this type include: benzoin ethers (e.g., benzoin methyl ether or benzoin isopropyl ether) or substituted benzoin ethers (e.g., anisoin methyl ether). Other exemplary photoinitiators are substituted acetophenones such as 2,2-diethoxyacetophenone or 2,2-dimethoxy-2-phenylacetophenone (commercially available under the trade designation "IRGACURE 651" from BASF Corp. (Florham Park, N.J.) or under the trade designation "ESACURE KB-1" from Sartomer (Exton, Pa.). Still other exemplary photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime. Other suitable photoinitiators include, for example, 1-hydroxycyclohexyl phenyl ketone (commercially available under the trade designation "IRGACURE 184" from BASF Corp.), bis(2,4,6-trimethylbenzoyl) phenylphosphine oxide (commercially available under the trade designation "IRGACURE 819" from BASF Corp.), 1-[4-(2-hydroxyethoxy)phenyl]-2-hydroxy-2-methyl-1-propane-1-one (commercially available under the trade designation "IRGACURE 2959" from BASF Corp.), 2-benzyl-2-dimethylamino-1-(4-morpholinophenyl)butanone (commercially available under the trade designation "IRGACURE 369" from BASF Corp.), 2-methyl-1-[4-(methylthio)phenyl]-2-morpholinopropan-1-one (commercially available under the trade designation "IRGACURE 907" from BASF Corp.), and 2-hydroxy-2-methyl-1-phenyl propan-1-one (commercially available under the trade designation "DAROCUR 1173" from Ciba Specialty Chemicals Corp. (Tarrytown, N.Y.).

The optimum amounts of the first photoinitiator system depend on the type used. Typical amounts include, but are not limited to, at least 0.01, 0.05, or even 0.1% wt; and at most 1, 3, or even 5% wt versus the amount of amorphous fluoropolymer. A second photoinitiator system is a multiple component system wherein a radical is generated through electron transfer to or from a second compound. For example, the photoinitiator system comprises a first component (A) which is a photosensitizer and a second component which comprises at least one of an iodonium salt (B) or an electron donor compound (C).

The first component (A) in the photoinitiator system is a photosensitizer compound. The photosensitizer is capable of electromagnetic radiation absorption somewhere within the range of the wavelength(s) of interest (for example if the actinic radiation is in the UV range, the photosensitizer should absorb wavelengths within the UV range). Suitable photosensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones), ketocoumarins, aminoarylketones and p-substituted aminostyryl ketone compounds are preferred sensitizers. An exemplary photosensitizer includes 2-isopropylthioxanthone; 2-chlorothioxanthone (ITX); and 9,10-dibutoxyanthracene. 9, 10

Suitable ketones include monoketones such as 2,2-, 4,4- or 2,4-dihydroxybenzophenone, di-2-pyridyl ketone, di-2-furanyl ketone, di-2-thiophenyl ketone, benzoin, fluorenone, 2-chlorothioxanthone, acetophenone, benzophenone, and the like. Suitable diketones include aralkyldiketones such as anthraquinone, phenanthrenequinone, and the like. Suitable α-diketones include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-3 3'- and 4,4'-dihydroxylbenzil, furil, di-3,3'-indolylethanedione, 2,3-bornanedione (camphorquinone), biacetyl, 1,2-cyclohexanedione, 1,2-naphthaquinone, acenaphthaquinone, and the like.

The second component can be (i) an iodonium salt, (ii) an electron donor compound, or (iii) an iodonium salt and an electron donor compound.

Suitable iodonium salts are described in U.S. Pat. Nos. 3,729,313, 3,741,769, 3,808,006, 4,250,053 and 4,394,403, the iodonium salt disclosures of which are incorporated herein by reference. The iodonium salt can be a simple salt (e.g., containing an anion such as $Cl^-$, $Br^-$, $I^-$ or $C_4H_5SO_3^-$) or a metal complex salt (e.g., containing $SbF_5OH^-$ or $AsF_6^-$). Mixtures of iodonium salts can be used if desired.

Exemplary iodonium salts include bis(4-t-butylphenyl) iodonium hexafluoroantimonate (available under the trade designation "FP5034" from Hampford Research Inc., Stratford, Conn.), bis(4-t-butylphenyl) iodonium hexafluorophosphate (available under the trade designation "FP5035" from Hampford Research Inc.), (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, ([4-(octyloxy)phenyl]phenyliodonium hexafluorophosphate), ([4-(octyloxy)phenyl]phenyliodonium hexafluoroantimonate), (4-isopropylphenyl)(4-methylphenyl)iodonium tetrakis(pentafluorophenyl) borate (available under the trade designation "RHODORSIL 2074" from Bluestar Silicones, East Brunswick, N.J.), bis(4-methylphenyl) iodonium hexafluorophosphate (available under the trade designation "OMNICAT 440" from IGM Resins, St. Charles, Ill.), 4-(2-hydroxy-1-tetradecyloxy)phenyl]phenyl iodonium hexafluoroantimonate. Preferred iodonium salts include diaryliodonium salts such as (4-isopropylphenyl)(4-methylphenyl)iodonium tetrakis (pentafluorophenyl) borate, bis(4-methylphenyl) iodonium hexafluorophosphate, bis(4-t-butylphenyl)iodonium hexafluoroantimonate, and bis(4-t-butylphenyl) iodonium hexafluorophosphate.

Preferred electron donor compounds include amines (including aminoaldehydes and aminosilanes), ascorbic acid and its salts. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as triethanolamine,N,N'-dimethylethylenediamine, p-N N-dimethyl-aminophenethanol; aminoaldehydes such as p-N,N-dimethylaminobenzaldehyde, p-N,N-diethylaminobenzaldehyde, and 4-morpholinobenzaldehyde.

Suitable ether donor compounds include 4,4'-dimethoxybiphenyl, 1,2,4-trimethoxybenzene and 1,2,4,5-tetramethoxybenzene.

The photosensitizer and at least one of the iodonium salt or electron donor are present in "photochemically effective amounts", that is, amounts of each component are sufficient to enable at least partial crosslinking of the fluoropolymer upon exposure to the actinic radiation. Preferably, for every 100 parts of fluoropolymer, the curable composition of the present disclosure contains about 0.005 to about 10 parts (more preferably about 0.1 to about 4 parts) each of iodonium salt, sensitizer and donor. The amounts of each component are independently variable and thus need not be equal, with larger amounts generally providing faster cure, but shorter shelf life. Sensitizers with high extinction coefficients (e.g., above about 10,000) at the desired wavelength of irradiation for photopolymerization generally are used in reduced amounts. In one embodiment, at least 0.01, 0.05, or even 0.1% wt; and at most 1, 3, or even 5% wt of the photosensitizer is used versus the amount of amorphous fluoropolymer; if the iodonium salt is used, at least 0.001, 0.01, 0.05, or even 0.1% wt; and at most 1, 3, or even 5% wt of the iodonium salt; and if the electron donor is used, at least 0.001, 0.01, 0.05, or even 0.1% wt; and at most 1, 3, or even 5% wt of the electron donor versus the amount of amorphous fluoropolymer.

A three component photoinitiator system comprising the photosensitizer, iodonium salt and an electron donor is described in U.S. Pat. No. 5,545,676 (Palazzotto, et al.), herein incorporated by reference with respect to the various components.

The photoinitiator is activated by irradiation with actinic radiation. As used herein, actinic radiation refers to electromagnetic radiation in the ultraviolet, visible, and infrared wavelengths. For example, in one embodiment, the photoinitiator is activated by irradiation of wavelengths from at least 180, 200, 210, 220, 240, 260, or even 280 nm; and at most 700, 800, 1000, 1200, or even 1500 nm. In one embodiment, the photoinitiator is activated by irradiation of wavelengths from at least 180, 210, or even 220 nm; and at most 340, 360, 380, 400, 410, 450, or even 500 nm. In one embodiment, the photoinitiator is activated by irradiation of wavelengths from at least 400, 420, or even 450 nm; and at most 700, 750, or even 800 nm. In one embodiment, the photoinitiator is activated by irradiation of wavelengths from at least 800, 850, or even 900 nm; and at most 1000, 1200, or even 1500 nm.

Peroxide Cure System

The compositions of the present disclosure comprise a peroxide cure system, which includes a peroxide and a Type II coagent.

In one embodiment, the peroxide is an organic peroxide, preferably, a tertiary butyl peroxide having a tertiary carbon atom attached to peroxy oxygen.

Exemplary peroxides include: benzoyl peroxide, dicumyl peroxide, di-tert-butyl peroxide, 2,5-di-methyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, 0,0'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.).

The amount of peroxide used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts of the amorphous fluoropolymer.

Coagents are reactive additives used to improve the peroxide curing efficiency by rapidly reacting with radicals and potentially suppressing side reactions and/or generating additional crosslinks. Coagents can be classified as Type I or Type II based on their contributions to the cure. Type I coagents are typically polar, multifunctional low molecular weight compounds which form very reactive radicals through addition reactions. Type I coagents can be readily homopolymerized and form crosslinks through radical addition reactions. Exemplary Type I coagents include multifunctional acrylate and methacrylate esters and dimaleimides. Type II coagents form less reactive radicals and contribute only to the state of cure. The coagent forms a radical through hydrogen abstraction or addition of a radical from the peroxide. These coagent radicals can then react with the fluoropolymer through the Br, I, and/or CN sites. Type II coagents comprising an allylic hydrogen tend to participate in intramolecular cyclization reactions as well as intermolecular propagation reactions. The peroxide cure system of the present disclosure comprises a peroxide and a Type II coagent. In one embodiment, the peroxide cure system of the present disclosure is substantially free of a Type I coagent, meaning that less than 5, 2, 1, 0.5, or even 0.1 wt % or even none of a Type I coagent is present versus the weight of the fluoropolymer. In one embodiment, the curable compositions of the present disclosure are substantially free (i.e., comprise less than 5, 2, 1, 0.5, 0.1 wt % or even none) of an unsaturated metal coagent of the formula $Y_{(4-n)}MX_n$ where Y is selected from alkyl, aryl, carboxylic acid, or alkyl ester groups, M is Si, Ge, Sn, or Pb, X is an allyl, vinyl, alkenyl, or propargyl group, and n is 1, 2, or 3.

As used herein, a Type II coagent refers to multifunctional polyunsaturated compound, which are known in the art and include allyl-containing cyanurates, isocyanurates, and phthalates, homopolymers of dienes, and co-polymers of dienes and vinyl aromatics. A wide variety of useful Type II coagents are commercially available including di- and tri-allyl compounds, divinyl benzene, vinyl toluene, vinyl pyridine, 1,2-cis-polybutadiene and their derivatives. Exemplary Type II coagents include a diallyl ether of glycerin, triallylphosphoric acid, diallyl adipate, diallylmelamine and trialyl isocyanurate (TAIC), tri(methyl)allyl isocyanurate (TMAIC), tri(methyl)allyl cyanurate, poly-triallyl isocyanurate (poly-TAIC), and xylylene-bis(diallyl isocyanurate) (XBD)

The amount of Type II coagent used generally will be at least 0.1, 0.5, or even 1 part by weight per 100 parts of amorphous fluoropolymer; and at most 2, 2.5, 3, or even 5 parts by weight per 100 parts of amorphous fluoropolymer.

Ideally, the peroxide curing system should not interfere with the photoinitiator system to achieve maximum curing. In one embodiment, the absorbance profile of the peroxide curing system (i.e., the peroxide and/or the Type II coagent) does not substantially interfere with the absorbance profile of the photoinitiator, meaning that the peroxide cure system does not absorb more than 30, 50, 60, or even 75% of the absorbed light. Absorbed light refers to the amount of light that impinges on the surface of the sample, but does not pass through the sample.

Substantially Free of a Binder Material

The compositions of the present disclosure are substantially free of a binder material. As used herein, a binder material is a material, which is added to a composition and which undergoes a reaction to form a three-dimensional network holding material of interest in a selected location to create a volume element. Binder materials may be polymerizable materials, which when activated polymerize to form a three-dimensional network, or the binder materials may be meltable materials, which are solidified to form a three-dimensional network. Binder materials may be used in the formation of green bodies. A green body is an object that comprises a main component (such as a binder material) which weakly binds another material together (such as a fluoropolymer). Upon treatment with one or more further processes (such as heat), the object is transformed into a final product, which is more robust. For example, in 3D printing applications, after the formation of a green body, the green body is subjected to a treatment to remove the binder material to form a robust shaped article. Typically, the green body is heated to sinter the fluoropolymer (i.e., anneal the fluoropolymer particles to form a more dense article), and also liquefy, combust, or degrade the binder material, removing it from the final article.

As mentioned above, the binder material includes polymerizable binder materials and meltable materials. Typical polymerizable binder materials include acrylic acid; methacrylic acid; alkyl acrylates; alkyl methacrylates; beta-carboxyethyl acrylate; mono-2-(methacryloxyethyl)succinate; hydroxyalkyl acrylates and methacrylates (such as hydroxyethyl acrylate, hydroxyethyl methacrylate, hydroxypropyl acrylate, hydroxypropyl methacrylate, hydroxyl butyl acrylate, and hydroxybutyl methacrylate); acryloxy and methacryloxy functional polyethylene oxide; polypropylene oxide; two or more (meth)acryloyl groups; and polymerizable silanes. Exemplary polymerizable binder materials include: mono-(methacryloxypolyethyleneglycol) succinate; methacryloxyalkyltrialkoxysilanes; acryloxyalkyltrialkoxysilanes (e.g., 3-methacryloxypropyltrimethoxysilane, 3-acryloxypropyl-trimethoxysilane, and 3-(methacryloxy)propyltriethoxysilane; as 3-(methacryloxy)propylmethyl-dimethoxysilane, and 3-(acryloxypropyl)methyldimethoxysilane); methacryloxyalkyldialkyl-alkoxysilanes or acryloxyalkyldialkylalkoxysilanes (e.g., 3-(methacryloxy)-propyldimethylethoxysilane); mercaptoalkyltrialkoxylsilanes (e.g., 3-mercapto-propyltrimethoxysilane); aryltrialkoxysilanes (e.g., styrylethyltrimethoxysilane); vinylsilanes (e.g., vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, and vinyltris(2-methoxyethoxy)silane); 1,2-ethanediol diacrylate; 1,3-propanediol diacrylate; 1,9-nonanediol diacrylate; 1,12-dodecanediol diacrylate; 1,4-butanediol diacrylate; 1,6-hexanediol diacrylate; butylene glycol diacrylate; bisphenol A diacrylate; diethylene glycol diacrylate; triethylene glycol diacrylate; tetraethylene glycol diacrylate; tripropylene glycol diacrylate; polyethylene glycol diacrylate; polypropylene glycol diacrylate; polyethylene/polypropylene copolymer diacrylate; polybutadiene di(meth)acrylate; propoxylated glycerin tri(meth)acrylate; neopentylglycol hydroxypivalate diacrylate modified caprolactone; trimethylolpropane triacrylate; pentaerythritol triacrylate; ethoxylated (3) trimethylolpropane triacrylate; ethoxylated (4) pentaerythritol tetraacrylate; tris(2-hydroxyethylisocyanurate) triacrylate; a mixture of pentaerythritol triacrylate and pentaerythritol tetraacrylate; pentaerythritol tetraacrylate; di-trimethylolpropane tetraacrylate; dipentaerythritol pentaacrylate; hexa-functional urethane acrylate; methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, 2-methylbutyl (meth)acrylate, n-hexyl (meth)acrylate, cyclohexyl (meth)acrylate, 4-methyl-2-pentyl (meth)acrylate, 2-ethylhexyl (meth)acrylate, 2-methylhexyl (meth)acrylate, n-octyl (meth)acrylate, isooctyl (meth)acrylate, 2-octyl (meth)acrylate, isononyl (meth)acrylate, isoamyl (meth)acrylate, 3,3,5-trimethylcyclohexyl (meth)acrylate, n-decyl (meth)acrylate, isodecyl (meth)acrylate, isobornyl (meth)acrylate, 2-propylheptyl (meth)acrylate, isotridecyl (meth)acrylate, isostearyl (meth)acrylate, octadecyl (meth)acrylate, 2-octyldecyl (meth)acrylate, dodecyl (meth)acrylate, lauryl (meth)acrylate, and heptadecanyl (meth)acrylate.

The compositions of the present disclosure are substantially free of a polymerizable binder, meaning that if they comprise a polymerizable binder material, it is in an amount which is ineffective, once polymerized, to form a solid or gel of sufficient strength to retain dimensional stability throughout the creation of the created object. In one embodiment, the compositions of the present disclosure comprise less than 5, 2, 1, 0.5, or even 0.1 wt % of a polymerized or polymerizable binder material based on the total weight of the composition, or even no detectable amount of a polymerized or polymerizable binder material. In one embodiment, the weight ratios of the amorphous fluoropolymer to a polymerizable binder material is greater than 6:1, 10:1 or even 100:1.

The curable compositions of the present disclosure are substantially free (i.e., comprise less than 1% or even 0.5% by weight) of a meltable binder, which is a material having a melting point from at least 40, 50 or even 60° C. and no greater than 100, 110, 120, 130, or even 140° C. Exemplary meltable binder materials include waxes, sugars, dextrins, and thermoplastics having a melting point below the thermal treatment temperature.

In one embodiment, the curable compositions of the present disclosure are substantially free (i.e., comprise less than 1% or even 0.5% by weight) of a binder material having a molecular weight of less than 5,000 g/mol.

Other Additives

In one embodiment, the compositions of the present disclosure comprise additional components, which facilitate the processing or final properties of the resulting article.

In one embodiment, the curable composition comprises a photoinhibitor. When performing shaped articles, photoinhibitors, help keep the radical reactions localized to the areas that have been exposed to the electromagnetic radiation. Such photoinhibitors slow down the radical propogation or terminate it, for example by acting as radical scavengers. A commercially available photoinhibitor includes 2,6-di-tert-butyl-4-methylphenol, available from Sigma-Aldrich, St Louis, Mo., USA. Optimum amounts of photoinhibitors depend on thephotoinitiator system, and the energy source used. Typical amounts of photoinhibitors include, but are not limited to amounts of from 0.9 to 0.001 times the amount of photosensitizer or the single component photoinitiator (by weight).

The curable compositions of the present disclosure may comprise ingredients, such as optical brighteners that compete with the photoinitiator for light absorption, thereby limiting overexposure and/or blurring in order to enhance resolution. Optical brighteners are chemical compounds that absorb light in the ultraviolet and violet region (usually 340-370 nm) of the electromagnetic spectrum, and re-emit light in the blue region (typically 420-470 nm) by fluorescence. A useful optical brightener is available under the trade designation "BENETEX OB-M1" from Mayzo, Inc., Suwanee, Ga. This UV brightener may also help to limit the penetration of the irradiation from the energy source through the curable composition and to contain the cure reaction to localized areas.

For the purpose of, for example, enhancing the strength or imparting the functionality, conventional adjuvants, such as, for example, fillers, acid acceptors, process aids, or colorants may be added to the curable composition.

Exemplary fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon particles (such as graphite or carbon black, carbon fibers, and carbon nanotubes), silicon carbide, boron nitride, molybdenum sulfide, high temperature plastics, an electrically conductive filler, a heat-dissipating filler, and the like may be added as an optional additive to the composition. High temperature plastics may be added to the curable composition to decrease cost, improve processing, and/or improve final product performance. These high temperature plastics have a melting point above the thermal treatment temperature. In one embodiment, the high temperature plastics have a melting point of at least 100, 120, or even 150° C. and at most 400, 350, 300, 320, or even 350° C. The high temperature plastics may be partially fluorinated polymers (e.g., copolymers of ethylene and chlorotrifluoroethylene; poly-VDF, or copolymers of TFE, HFP, and VDF); perfluorinated polymers (e.g., fluorinated ethylene propylene polymers, and perfluorinated alkoxy polymers (PFA); or non-fluorinated polymers (e.g., polyamide, polyaramid, polybenzimidazol, polyether ether ketone, polyphenylene sulfide). Such high temperature thermoplastics are described in WO 2011/035258 (Singh et al.). Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10).

In one embodiment, the filler content is between 0.01 to 10% or up to 30% or even up to 50% by weight based on the total weight of the composition.

Conventional adjuvants may also be incorporated into the composition of the present disclosure to enhance the properties of the resulting composition. For example, acid acceptors may be employed to facilitate the cure and thermal stability of the compound. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amounts ranging from about 1 to about 20 parts per 100 parts by weight of the polymer.

The additives described above may be selected to alter the properties of the resulting article not/or not interfere with the curing of the composition using actinic radiation. For example, in one embodiment, when the green body is exposed to thermal treatment, the pigment is heat-stable at the temperatures applied. In one embodiment, the filler is transparent. In one embodiment, the filler has a particle size of less than 500 µm, preferably less than 50 µm or even less than 5 µm.

Solvent

The curable compositions of the present disclosure may or may not comprise a solvent. A solvent can be used to adjust the viscosity of the curable composition to enable processing and/or to solubilize components for improved reaction.

In one embodiment, the curable composition is a solution or liquid dispersion containing the amorphous fluoropolymer, the peroxide cure system, photoinitiator, and optional additives and a solvent such as water, ketone (e.g., acetone, methyl ethyl ketone, methyl isobutyl ketone), ether (e.g., diethyl ether, tetrahydrofuran), ester (e.g., ethyl acetate, butyl acetate), and fluorinated inert solvents (e.g., fluorinated solvents such as those available under the trade designation "3M FLUOROINERT ELECTRONIC LIQUID" and "3M NOVEC ENGINEERED FLUID" from 3M Co., St. Paul, Minn.). In one embodiment, the solvent is a partially fluorinated ether or polyether as disclosed in EP Appl. No. 16203046.4 (filed 8 Dec. 2016), incorporated by reference. When a solvent is used, typically the curable composition comprises less than 20, or even 10% by weight of a solvent.

In one embodiment, the curable composition consists essentially of the amorphous fluoropolymer, the peroxide cure system, photoinitiator, and optional additives. In other words, the curable composition is substantially free of solvent (i.e, less than 5, 1 or even 0.5% by weight based on the total weight of the curable composition) and substantially free of polymers that have a melting point or thermal decomposition temperature below the thermal treatment temperature (i.e., less than 5, 1, or even 0.5% by weight versus the amorphous fluoropolymer). The thermal treatment temperature is the temperature at which the green body cures to form a robust article as will be discussed below.

In one embodiment, the amorphous fluoropolymer content of the curable compositions is preferably as high as possible, for example, at concentrations from at least 50, 75, 80, 85, or even 90% by weight; and at most 95, 98, 99, or even 99.5% by weight based on the total weight of the curable composition.

In one embodiment, the curable composition of the present disclosure consists essentially of:
  (a) an amorphous fluoropolymer having an iodine, bromine and/or nitrile cure site;
  (b) a peroxide cure system comprising a peroxide and a Type II coagent;
  (c) a photoinitiator, and
  (d) optionally, an additive selected from the group consisting of a solvent, an inorganic filler, a high temperature thermoplastic, a carbon particle, or an acid acceptor. The phrase "consists essentially of" means that the composition comprises the elements listed and may include additional elements not listed so long as they do not materially affect the composition. In other words, if all traces of the non-listed element were removed, the processing (e.g., curing time, extrusion rate, etc.) and final product characteristics (e.g., chemical and thermal resistance, hardness, etc.) of the composition would remain unchanged.

In one embodiment, the curable composition of the present disclosure comprises:
  (a) an amorphous fluoropolymer having an iodine, bromine and/or nitrile cure site;
  (b) a peroxide cure system comprising a peroxide and a Type II coagent;
  (c) a photoinitiator, and
  (d) optionally, an additive selected from the group consisting of a solvent, an inorganic filler, a high temperature thermoplastic, a carbon particle, or an acid acceptor, wherein the total weight of elements (a), (b), (c), and (d) comprise at least 95, 98, 99.0, 99.5, or even 99.9% by weight versus the total weight of the curable composition.

Method of Making

The curable composition comprising the amorphous fluoropolymer, the peroxide cure system, photoinitiator, optional additives, and optional solvent is at least partially cured using actinic radiation. Actinic radiation includes electromagnetic radiation in the ultraviolet, visible, and infrared wavelengths.

In one embodiment, the curable composition is exposed to wavelengths from at least 180, 200, 210, 220, 240, 260, or even 280 nm; and at most 700, 800, 1000, 1200, or even 1500 nm. In one embodiment, the curable composition is exposed to wavelengths from at least 180, 210, or even 220 nm; and at most 340, 360, 380, 400, 410, 450, or even 500 nm. In one embodiment, the curable composition is exposed to wavelengths from at least 400, 420, or even 450 nm; and at most 700, 750, or even 800 nm. In one embodiment, the curable composition is exposed to wavelengths from at least 800, 850, or even 900 nm; and at most 1000, 1200, or even 1500 nm.

Any light source, as long as part of the emitted light can be absorbed by the photo-initiator or photo-initiator system, may be employed as a radiation source, such as, a high or low pressure mercury lamp, a cold cathode tube, a black light, a light emitting diode, a laser, and a flash light. Of these, the preferred source is one exhibiting a relatively long wavelength UV-contribution having a dominant wavelength of 300-400 nm. UV radiation is generally classed as UV-A, UV-B, and UV-C as follows: UV-A: 400 nm to 320 nm; UV-B: 320 nm to 290 nm; and UV-C: 290 nm to 100 nm.

In one embodiment, the dosage of the actinic radiation is 10-1000 watts.

In one embodiment, the curable composition is coated onto a substrate and then exposed to actinic radiation. For example, the curable composition is coated onto a substrate using techniques known in the art including, for example, dip coating, spray coating, spin coating, blade or knife coating, bar coating, roll coating, and pour coating (i.e., pouring a liquid onto a surface and allowing the liquid to flow over the surface)). Substrates may include, metals (such as carbon steel, stainless steel, and aluminum), plastics (such as polyethylene, or polyethylene teraphthalate), or release liners, which are a temporary support comprising a backing layer coated with a release agent (such as a silicone, fluoropolymer, or polyutherane). The composite comprising the substrate and a layer of curable composition is then exposed to actinic radiation to at least partially cure the curable composition. In one embodiment, a thin coating of the curable composition is disposed on a substrate, for example a coating thickness of at least 10 nm or even 100 nm to at most 1 µm, 10 µm, or even 100 µm. In one embodiment, the thin coating is substantially crosslinked with the actinic radiation, meaning that when tested following the Gel Test Method described below, there is at least 65, 70, 80, or even 90% gelling.

In another embodiment, the curable composition is first exposed to the actinic radiation which partially cures the composition to form a shaped green body. Then, the shaped green body is exposed to thermal treatment forming the final, robust article. In one embodiment, the curable composition during exposure to actinic radiation does not achieve a temperature at or above the 1 hour half life temperature of the peroxide present in the curable composition before the subsequent thermal treatment step. For example, if the curable composition comprised benzoyl peroxide, which has a half life temperature for 1 hour of 92° C., then during the actinic radiation step, the curable composition should be maintained at a temperature below 92° C.

In one embodiment, the partially cured composition in the subsequent thermal treatment step is exposed to temperatures at least 60, 80, or even 100° C.; and most 200, 250, or even 300° C. for up to 5 hrs. In the thermal treatment step, the composition is exposed to a heat source, such as a hot plate, oven, hot air, hot press and the like, which causes the peroxide cure system to generate radicals.

Such a dual curing process described above may be advantageous when using additive processing techniques. Additive processing, also known as "3D printing", or "additive manufacturing (AM)", refers to a process to create a three-dimensional object by sequential deposition or solidification of materials in defined areas, typically by generating successive layers of material. The object is typically produced under computer control from a 3D model or other electronic data source by an additive printing device typically referred to as a 3D printer. The term "3D printer" and "additive processing device" are used herein interchangeably and generally refer to a device by which additive processing can be carried out. The terms "3D-printing" and "3D-printable" are used likewise and mean additive processing and suitable for additive processing.

Additive processing devices are devices by which sequential deposition or solidification of material in defined areas can be achieved, typically by deposition or solidification of volume elements, such as layers. Successive layers are built up, layer-on-layer to create a three-dimensional object.

Additive processing techniques are known. Objects can be created from liquid 3D printable compositions or solid 3D-printable compositions depending on the additive processing method and device used. Additive processing can allow for the manufacture of defined geometrical shapes such as circles, semicircles, ellipses, half-spheres, squares, rectangles, cubes, polygons (including but not limited to triangles hexagons, pentagons, and octagons) and polyhedrons, which may be three-dimensional, complex, and/or have small feature sizes. In one embodiment, the curable composition is extruded through an orifice and then exposed to actinic radiation to quickly crosslink the curable composition and form a green body.

In one embodiment, layers are formed by crosslinking the amorphous fluoropolymer in the curable composition in controlled areas by exposure to actinic radiation.

Stereolithography (SL) or vat polymerization (VP) are different types of additive manufacturing techniques. Stereolithography is an additive manufacturing process that works by focusing electromagnetic irradiation (including, for example, irradiation with ultraviolet light (UV)) on to a vat of composition containing polymerizable material. With the help of computer aided manufacturing or computer aided design software (CAM/CAD), the irradiation is used to draw a pre-programmed design or shape on to the surface of the 3D-printable composition. Because the 3D-printable composition is reactive to the irradiation, the composition is solidified or gels and forms a single layer of the desired 3D object on the areas exposed to the irradiation. This process is repeated for each layer of the design under the 3D object is complete. Typically, the 3D printer used for stereolithography contains an elevator platform that descends a distance equal to the thickness of a single layer of the design (typically 0.05 mm to 0.15 mm) into the photopolymer vat. Then, a resin-filled blade may sweep across a cross section of the layer, re-coating it with fresh material. The subsequent layer is traced, joining the previous layer. A complete 3D object can be formed using this process. Exemplary 3D printing techniques for manufacturing elastomers are described in WO publications 2016071241 (Selbertinger et al.) and 2017112653 (Roland et al.), herein incorporated by reference.

Depending on the design of the additive processing device another typical method raises or lowers the build platform further than one layer or volume element so that the material is able to easily flow over the previous layer/volume element. Upon returning to the desired step height the previous layer is uniformly covered. The subsequent layer is traced joining the previous layer. A complete 3D object can be formed using this process.

In a variant of this method, the curable composition is applied as extrudable composition through a nozzle at an extrusion head that may or may not be heated to a selected location. Curing is carried out as described above for the stereolithography process at the selected location but may already initiated or completed during the extrusion onto the selected location. This method is referred to as "paste extrusion".

After partially curing the curing composition, the shaped article may be separated from unreacted curable composition if applicable, with the unreacted curable composition may be discarded or reused. If solvent is present, the solvent may be removed via drying. Drying should be carried out in a manner that the entirety of the green body dries as uniform as possible to avoid the formation of cracks or tilts in the object. This can be done in a multitude of ways. For example, but not limited thereto, the drying can be carried out at room temperature for 12 or 24 hours. In cases where the exterior of the article dries quicker than the interior, quick uniform drying in a vacuum oven may be preferred, for example, but not limited to, drying at 760 to $1 \times 10^{-3}$ Torr at a temperature between 40-70° C. In case of larger articles where water is the solvent, drying in a humid environment of 50 to 90% humidity over the course of at least 48 hours may be preferred.

The partially cured articles mentioned above are shaped in three dimensions. The partially cured shaped article is then exposed to a thermal treatment, which more fully cures the article. Such thermal treatments involve temperatures of sufficient temperature to cause the peroxide to decompose. The thermal treatment should be at least at or above the 1 hour half life temperature for the peroxide and below the decomposition temperature of the fluoroelastomer. For example, the thermal treatment should be at least 90° C. and at most 250° C. In one embodiment, the partially cured shaped article is exposed to an additional actinic radiation source prior to thermal treatment to further react unreacted photoinitiator.

Articles

The articles of the present disclosure are shaped and can include bearings, for example friction bearings or piston bearings, gaskets, shaft seals, ring lip seals, washer seals, O-rings, grooved seals, valves and valve seats, connectors, lids, tubing and containers. Fluoropolymer articles of big and small dimensions can be produced depending on the processing technique used. In one embodiments fluoropolymer articles having at their longest axis or diameter of from about 0.1 to about 200 mm may be produced.

The curable compositions of the present disclosure are substantially free of binder material. The absence of using binder materials when making shaped article can lead to advantages, such as reduced cost and reduced processing time. Binder materials can potentially impact the physical properties (such as density) of the final article as well.

In one embodiment, the cured articles of the present disclosure have a tan delta of less than 2, or even 1 for at least partially cured fluoropolymers and a tan delta of less than 0.25 or even 0.20 for cured fluoroelastomers. Tan delta can be measured as described in the test method below or by using ASTM D6204-15 "Standard Test Method for Rubber—Measurement of Unvulcanized Rheological Properties Using Rotorless Shear Rheometer" or ASTM D6601-15 "Standard Test Method for Rubber Properties—Measurement of Cure and After-Cure Dynamic Properties Using a Rotorless Shear Rheometer".

Exemplary embodiments of the present disclosure, include, but are not limited by, the following:

Embodiment 1

A curable composition comprising:
(a) an amorphous fluoropolymer having an iodine, bromine and/or nitrile cure site;
(b) a peroxide cure system comprising a peroxide and a Type II coagent; and
(c) a photoinitiator,
wherein the curable composition is substantially free of a binder material.

Embodiment 2

The curable composition of embodiment 1, wherein the curable composition is substantially free of an unsaturated metal coagent.

Embodiment 3

The curable composition of any one of the previous embodiments, wherein the amorphous fluoropolymer is partially fluorinated.

Embodiment 4

The curable composition of any one of the previous embodiments, wherein the amorphous fluoropolymer is derived from vinylidene fluoride.

Embodiment 5

The curable composition of any one of the previous embodiments, wherein the absorbance profile of the peroxide does not substantially interfere with the absorbance profile of the photoinitiator.

Embodiment 6

The curable composition of any one of the previous embodiments, wherein the amorphous fluoropolymer comprises at least one of a carbon-carbon double bond, or a unit capable of forming carbon-carbon double bonds along the amorphous fluoropolymer chain.

Embodiment 7

The curable composition of any one of the previous embodiments, wherein the amorphous fluoropolymer comprises at least 0.1 wt % of an iodine, bromine and/or nitrile cure site.

Embodiment 8

The curable composition of any one of the previous embodiments, wherein the peroxide cure system consists essentially of a peroxide and a Type II coagent.

Embodiment 9

The curable composition of any one of the previous embodiments, wherein the amorphous fluoropolymer is a copolymer of (i) hexafluoropropylene, tetrafluoroethylene, and vinylidene fluoride; (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, or (vi) ethylene, tetrafluoroethylene, and perfluoromethyl vinyl ether, and (vii) blends thereof.

Embodiment 10

The curable composition of any one of the previous embodiments, wherein the curable composition comprises at least 0.1 peroxide per 100 parts of the amorphous fluoropolymer.

Embodiment 11

The curable composition of any one of the previous embodiments, wherein the peroxide is at least one of 2,5-dimethyl-2,5-di(t-butylperoxy)hexane; dicumyl peroxide; di(2-t-butylperoxyisopropyl)benzene; dialkyl peroxide; bis(dialkyl peroxide); 2,5-dimethyl-2,5-di(tertiarybutylperoxy) 3-hexyne; dibenzoyl peroxide; 2,4-dichlorobenzoyl peroxide; tertiarybutyl perbenzoate; α,α'-bis(t-butylperoxy-diisopropylbenzene); t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy)butyl] carbonate, carbonoperoxoic acid, or 0,0'-1,3-propanediyl OO,OO'-bis(1,1-dimethylethyl) ester.

Embodiment 12

The curable composition of any one of the previous embodiments, wherein curable composition is substantially free of polymerizable acrylate, polymerizable methacrylate, or combinations thereof.

Embodiment 13

The curable composition of any one of the previous embodiments, wherein the curable composition is substantially free of a binder material having a molecular weight of less than 5,000 g/mol.

Embodiment 14

The curable composition of any one of the previous embodiments, wherein the Type II coagent comprises at least one of diallyl ether of glycerin, triallylphosphoric acid, diallyl adipate, diallylmelamine and triallyl isocyanurate, tri(methyl)allyl isocyanurate, tri(methyl)allyl cyanurate, poly-triallyl isocyanurate, and xylylene-bis(diallyl isocyanurate).

Embodiment 15

The curable composition of any one of the previous embodiments, wherein the Type II coagent is present from 0.1 to 10 parts by weight per 100 parts of the amorphous fluoropolymer.

Embodiment 16

The curable composition of any one of the previous embodiments, wherein the curable composition comprises at least 0.1% of the photoinitiator.

Embodiment 17

The curable composition of any one of the previous embodiments, wherein the photoinitiator is at least one of 2-benzyl-2-dimethylamino-1-(4-morpholinophenyl)-butanone-1, phenyl bis(2,4,6-trimethyl benzoyl) phosphine oxide, diphenyl (2,4,6-trimethylbenzoyl) phosphine oxide. and bis (eta 5-2,4-cyclopentadien-1-yl) bis [2,6-difluoro-3-(1H-pyrrol-1-yl)phenyl]titanium.

Embodiment 18

The curable composition of any one of embodiments 1-17, wherein the photoinitiator comprises a photosensitizer, and at least one of an iodonium salt or an electron donor.

Embodiment 19

The curable composition of embodiment 18, wherein the photosensitizer is at least one of 2-isopropylthioxanthone; 2-chlorothioxanthone; and 9,10-dibutoxyanthracene.

Embodiment 20

The curable composition of any one of embodiments 18-19, wherein the iodonium salt is one or a mixture of isopropylphenyl-4-methylphenyliodonium tetrakis(pentafluorophenyl)borate, bis(4-tert-butylphenyl) iodonium tetraphenylborate, bis(4-t-butylphenyl) iodonium hexafluorophosphate, bis(4-tert-butylphenyl) iodonium hexafluoroantimonate, and bis(4-methylphenyl) iodonium hexafluorophosphate.

Embodiment 21

The curable composition of any one of embodiments 18-20, wherein the electron donor comprises at least one of: a tertiary amine; triethanolamine; N,N'-dimethylbenzylamine; p-dimethylamino-benzaldehyde; 2,2'-(4-Methylphenylimino)diethanol; and 2-[4-(Dimethylamino)phenyl]ethanol.

Embodiment 22

The curable composition of any one of the previous embodiments, wherein the curable composition further comprises a filler.

Embodiment 23

The curable composition of embodiment 22, wherein the filler is transparent.

Embodiment 24

The curable composition of embodiment 22, wherein the filler is carbon black.

Embodiment 25

The curable composition of any one of the previous embodiments, further comprising 40-60 wt % of a solvent.

Embodiment 26

The curable composition of any one of embodiments 1-25, wherein the curable composition is substantially free of a solvent.

Embodiment 27

A cured composition derived from the curable composition according to any one of embodiments 1-26.

Embodiment 28

The cured composition according to embodiment 27, wherein the cured composition has a tan delta of less than 0.25.

Embodiment 29

A method of UV-curing a fluoroelastomer, the method comprising: exposing the curable composition according to any one of embodiments 1-26 to actinic radiation.

Embodiment 30

The method of embodiment 29, wherein the curable composition is disposed as a layer on a substrate.

Embodiment 31

The method of embodiment 30, wherein the layer has a thickness of 10-500 micrometers.

Embodiment 32

The method of any one of embodiments 29-30, wherein the substrate comprises at least one of carbon steel, stainless steel and aluminum.

Embodiment 33

A method of dual curing an amorphous fluoropolymer, the method comprising:
  Exposing the curable composition according to any one of embodiments 1-26 to actinic radiation to form a partially cured composition; and
  Exposing the partially cured composition to a heat source wherein the peroxide is not benzoyl peroxide.

Embodiment 34

The method of embodiment 33, wherein the actinic radiation is selected from ultraviolet radiation, visible radiation or infrared radiation.

Embodiment 35

The method of any one of embodiments 33-34, wherein the dose of actinic radiation is 10-1000 watts.

Embodiment 36

The method of any one of embodiments 33-35, wherein the partially cured composition is exposed to temperatures no higher than 250° C.

Embodiment 37

The method of any one of embodiments 33-36, wherein the curable composition is an extrudate.

Embodiment 38

A method of making a shaped article, the method comprising:
  (a) exposing the composition of any one of embodiments 1-26 to actinic radiation to partially cure the composition to form a shaped article; and
  (b) exposing the shaped article to heat source to further cure the shaped article.

Embodiment 39

The method of embodiment 38, wherein the shaped article is a o-ring, seal, or gasket.

Embodiment 40

A method of producing a fluoropolymer article comprising subjecting the curable composition according to any one of embodiments 1-26 to additive processing in an additive processing device containing at least one actinic radiation source.

Embodiment 41

The method of embodiment 40, wherein the additive processing device is an extrusion or jetting based device.

Embodiment 42

The method of embodiment 40, wherein the additive processing device is a stereolithography device.

Embodiment 43

An article comprising a component, wherein the component is a fluoroelastomer article obtained by the method according to any one of embodiments 38-42.

Embodiment 44

A curable composition consisting essentially of:
  (a) an amorphous fluoropolymer having an iodine, bromine and/or nitrile cure site;
  (b) a peroxide cure system comprising a peroxide and a Type II coagent;
  (c) a photoinitiator, and
  (d) optionally, an additive selected from the group consisting of an inorganic filler, a carbon particle, a high temperature plastic, or an acid acceptor.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following abbreviations are used in this section: mL=milliliters, g=grams, kg=kilograms, lb=pounds, cm=centimeters, mm=millimeters, µm=micrometers, mil=thousandths of an inch, wt %=percent by weight, min=minutes, h=hours, d=days, N=newtons, NMR=nuclear magnetic resonance, ppm=parts per million, prh=part per hundred rubber, rpm=revolutions per minute, and eq=equivalent. Abbreviations for materials used in this section, as well as descriptions of the materials, are provided in Table 1.

TABLE 1

| Material | Details |
|---|---|
| Fluoropolymer 1 | An amorphous fluoropolymer derived from 61 wt % of vinylidene fluoride and 39 wt % of hexafluoropropylene monomers. The iodine content is 0.6 wt % and the fluorine content is 65.9%. Mooney viscosity measured at 100° C. is 3.5. |
| Fluoropolymer 2 | An amorphous fluoropolymer derived from 54 wt % of vinylidene fluoride, 34 wt % of hexafluoropropylene and 12 wt % of tetrafluoroethylene monomers. The iodine content is 0.15 wt % and the bromine contain is 0.2 wt %. The fluorine content of is 69.8%. Mooney viscosity measured at 121° C. is 36. |
| Fluoropolymer 3 | A polymer blend containing 80 wt % of an amorphous fluoropolymer and 20 wt % of a tetrafluoroethylene/perfluoropropyl vinylether (PFA) plastic. The fluoroelastomer portion is derived from 36 wt % of vinylidene fluoride, 41 wt % of hexafluoropropylene and 23 wt % of tetrafluoroethylene monomers. The bromine content is 0.5 wt % and the fluorine content is 70%. Melt flow index of PFA is 2.0. Mooney viscosity of the blend measured at 121° C. is 70. |
| PFA 6502TAZ | A fluoroplastic agglomerate available under the trade designation "3M DYNEON FLUOROPLASTIC AGGLOMERATE PFA 6502TAZ" from 3M Company |
| TAIC | Trially isocyanurate, ≥98%, available from TCI America, Portland, OR, USA |
| FP5035 | Bis(4-t-butylphenyl) iodonium hexafluorophosphate, available from Hampford Research Inc, Stratford, CT, USA |
| ITX | 2-Isopropylthioxanthone, available from Sigma-Alrich |
| DBPH | 2,5-Bis(tert-butylperoxy)-2,5-dimethylhexane, 90%, available from Sigma-Alrich |
| Benzoyl peroxide | Available from Sigma-Aldrich |
| IRGACURE 184 | 1-hydroxycyclohexyl phenyl ketone, available under the trade designation "IRGACURE 184" from BASF Corp., Florham Park, NJ, USA |
| IRGACURE 369 | 2-benzyl-2-dimethylamino-1-(4-morpholinophenyl) butanone, available under the trade designation "IRGACURE 369" from BASF Corp. |
| IRGACURE 819 | bis(2,4,6-trimethylbenzoyl)phenylphosphine oxide, available under the trade designation "IRGACURE 819" from BASF Corp. |
| TEA | Triethanolamine, available from Avantor Performance Materials, Inc., Center Valley, PA, USA |
| ZnO | USP grade, from Horsehead Corp., Pittsburgh PA |
| CaSiO$_3$ | Wollastonite powder, available under the trade designation "WOLLASTOCOAT 10222" from Nyco Minerals, Willsboro, NY, USA |
| EtOAc | Ethyl acetate, available from VWR International, West Chester, PA, USA |
| MEK | 2-Butanone available from EMD Millipore Corporation, Billerica, MA, USA |
| MeOH | Methanol, available from Sigma-Aldrich |
| Polyimide film | 5 mil (127 micron) polyimide film from AMD Converting and Label LLC, Waukesha, WI |

Test Procedures
Tan Delta:

The UV rheology measurements were conducted using a rheometer available under the trade designation ARES-G2 fitted with UV CURING ACCESSORY, both from TA Instruments, New Castle, Del., USA. A portable mercury vapor bulb, 200 Watt lamp light source with high UVA irradiance up to 10 W/cm$^2$ in wavelengths from 320 to 500 nm, available under the trade designation OMNICURE S2000 from Excelitas Technologies, Covina, Calif., USA, was used to provide light to the curable compositions. Testing samples were prepared by drying approximately 0.5 g samples of curable composition, prepared as described below, overnight on a 25 mm diameter aluminum plate. The majority of solvent in the samples evaporated overnight; samples were further dried under vacuum oven for 30 min. The dried samples were pressed down and centered on an aluminum plate with a stainless steel spatula before mounting on the lower plate of the rheometer. An upper, quartz plate allowed UV light from the portable light source to reach the sample. The sample gap between aluminum and quartz plates was between 0.5 and 0.7 mm. The test parameters of oscillation were set to 1.7 Hz frequency and 7.0% of strain, at ambient temperature. At 30 s after the start of each measurement, the light source was turned on. The changes of storage modulus (G') and loss modulus (G") were monitored during 5 min of UV irradiation. The tan delta values (Tan δ=G"/G') after 5 min of UV irradiation are presented in the Table 4 below.

Gel Test:

The gel test was done by measuring the mass of a cured sample (approximately 0.2 g) and then placing it between pieces of wire mesh (square weave, stainless steel type 304, woven construction, 325 mesh, 0.0014" wire, 0.0017" opening), available as item number 3888704810 from McNICHOLS CO., Minneapolis, Minn., USA, and soaking in 10 g of MEK for 24 h. After soaking, the sample was then removed from the solvent and the solvent was dried from the surface of the sample. The mass of the sample was measured. The percent gel was calculated as the ratio of the post-soaking mass to the pre-soaking mass, multiplied by 100%.

The ratios of each component in examples and counter examples are indicated as phr in Tables 1 through 4.

Counter Example 1 (CE-1)

5.0 g of Fluoropolymer 1 was slowly dissolved in 5.0 g of EtOAc overnight in an amber bottle. Then 0.15 g of TAIC, and 0.050 g of DBPH was added to the mixture. The mixture was oscillated on a mixer at 250 rpm for approximately 2 to 3 h until the mixture became homogeneous.

Counter Examples 2 Through 5 (CE-2 Through CE-5)

CE-2 through CE-5 were prepared similar to CE-1 except the 0.050 g of DBPH was replaced with benzoyl peroxide, IRGACURE 184, IRGACURE 369, or IRGACURE 819. Shown in Table 1 below are the parts of the various components for each sample.

Samples of approximately 0.4 to 0.5 g of the mixture from CE-1 to CE-5 were dropped by pipette onto 75×50×1.0 mm glass microscope slides, available from VWR, Radnor, Pa., USA, and allowed to dry under flowing N2 for approximately 30 to 60 min, until samples were dry to the touch. Then, samples were either heat cured or UV cured, as indicated in Table 1. The heat cured samples (CE-1 and CE-2) were cured at 177° C. for approximately 10 to 15 min in a batch oven available under the trade designation "FED 115-UL E2" from BINDER, Tuttingen, Germany. The UV cured samples (CE-3 through CE-5) were irradiated under a UV lamp providing 365 nm wavelength light at an output power of 36 Watts, available under the trade designation "DR-301C" from ASIGA, Anaheim Hills, Calif., USA, for 3 min. After curing, Gel Test was performed on the samples. The results are presented in Table 1.

TABLE 1

|  | CE-1 | CE-2 | CE-3 | CE-4 | CE-5 |
|---|---|---|---|---|---|
| Fluoropolymer 1 | 100 | 100 | 100 | 100 | 100 |
| TAIC | 3 | 3 | 3 | 3 | 3 |
| DBPH | 1 |  |  |  |  |
| Benzoyl peroxide |  | 1 |  |  |  |
| Irgacure 184 |  |  | 1 |  |  |
| Irgacure 369 |  |  |  | 1 |  |
| Irgacure 819 |  |  |  |  | 1 |
| Cure type | Heat Cure |  |  | UV lamp |  |
| Gel Test (%) | 20 | 63 | 1 | 54 | 27 |

Counter Examples 6 Through 12 (CE-6 Through CE-12)

For CE-6 through CE-12, the procedure described for CE-1 was followed, with the exception that instead of using a peroxide or a single component photoinitiator, a multi-component photoinitiator system in a 50% solution in EtOAc was used. The ratios of the various components including the photosensitizer, electron donor and iodonium saltare shown in Table 2. CE-6 through CE-12 were irradiated under a UV lamp following the method described above (365 nm wavelength light at an output power of 36 Watts for 3 min) and tested by the Gel Test. The results are shown in Table 2.

TABLE 2

|  | CE-6 | CE-7 | CE-8 | CE-9 | CE-10 | CE-11 | CE-12 |
|---|---|---|---|---|---|---|---|
| Fluoropolymer 1 | 100 | 100 | 100 | 100 | 100 | 100 | 100 |
| TAIC | 3 | 3 | 3 | 3 | 3 | 3 | 3 |
| FP5035 | 0.5 | 0.5 | 0.5 | 0.5 |  | 0.5 |  |
| ITX | 1.0 | 0.3 | 0.1 |  | 0.3 | 0.3 | 0.3 |
| TEA | 1.0 | 1.0 | 1.0 | 1.0 | 1.0 |  |  |
| Gel Test (%) | 21 | 51 | 36 | 1 | 20 | 1 | 1 |

Examples 1 Through 2 (EX-1 Through EX-2) and Counter Examples 13 Through 14 (CE-13 Through CE-14)

EX-1, EX-2, CE-13 and CE-14 were prepared following the procedure described for CE-1, except that both a peroxide cure system and a photoinitiator system were used. See Table 3 for the parts of the various components used in each example. Each of the examples (approximately 0.4 to 0.5 g) was dropped onto a glass microscope slide and allowed to dry as described above for CE-1. First, the samples were exposed to actinic radiation (were irradiated under a UV lamp providing 365 nm wavelength light at an output power of 36 Watts for 3 min), then the sample was thermally treated by placing the slides in a batch over and heating at 177° C. for approximately 10 to 15 min. A Gel Test was performed on the samples after the first curing step and after the second curing step. The results are presented in Table 3.

TABLE 3

| Examples | EX-1 | CE-13 | EX-2 | CE-14 |
|---|---|---|---|---|
| Fluoropolymer 1 | 100 | 100 | 100 | 100 |
| TAIC | 3 | 3 | 3 | 3 |
| Irgacure 369 | 1 | 1 |  |  |
| DBPH | 1 |  | 1 |  |
| Benzoyl peroxide |  | 1 |  | 1 |
| FP5035 |  |  | 0.5 | 0.5 |
| ITX |  |  | 0.3 | 0.3 |
| TEA |  |  | 1.0 | 1.0 |
| Gel Test (%) after first cure | 51 | 2 | 55 | 2 |
| Gel Test (%) after second cure | 53 | 19 | 79 | 51 |

It is noted that CE-13 and CE-14 both comprised a peroxide cure system (i.e., a peroxide and a Type II coagent) and a photoinitiator system. However, both of these comparative examples showed low % gel after the first cure. Although not wanting to be limited by theory, it is believed that the benzoyl peroxide is interacting with the curable composition preventing curing when exposed to actinic radiation.

Examples 3 and 4 (EX-3 and EX-4) and Counter Examples 15 Through 18 (CE-15 Through CE-18)

For EX-5 and EX-6 and CE-13 through CE-16, the procedure described for CE-1 was followed using various components as shown in Table 4 below. The samples were prepared and cured as described above for EX-1 by exposure to actinic radiation (for 5 min instead of 3 min) followed by thermal treatment. In addition to the Gel Test, the Tan Delta Test was performed on the samples after the first curing step and after the second curing step. The results are shown in Table 4.

TABLE 4

| Examples |  | CE-15 | CE-16 | CE-17 | CE-18 | EX-3 | EX-4 |
|---|---|---|---|---|---|---|---|
| Fluoropolymer 1 |  | 100 | 100 | 100 | 100 | 100 | 100 |
| TAIC |  | 3 | 3 | 3 | 3 | 3 | 3 |
| Irgacure 369 |  |  |  | 1 |  | 1 |  |
| FP5035 |  |  |  |  | 0.5 |  | 0.5 |
| ITX |  |  |  |  | 0.3 |  | 0.3 |
| TEA |  |  |  |  | 1.0 |  | 1.0 |
| DBPH |  |  | 1 |  |  | 1 | 1 |
| Curing Condition I | Gel Test (%) | 0 | 0 | 79 | 68 | 84 | 78 |
| Curing Condition I | Tan delta | 1.74 | 1.21 | 0.31 | 0.31 | 0.30 | 0.33 |
| Curing Condition II | Gel Test (%) | NM | NM | 77 | 70 | 85 | 86 |
| Curing Condition II | Tan delta | NM | NM | 0.28 | 0.29 | 0.23 | 0.20 |

Curing Condition I: UV irradiation for 5 min
Curing Condition II: 1$^{st}$ Step: actinic irradiation for 5 min; 2$^{nd}$ Step: thermal treatment for approximately 10 to 15 min
NM = Not Measured Example 5 Through Example 7 (EX-5 Through EX-7) and Counter Example 19 Through Counter Example 23 (CE-19 Through CE-23)

These examples demonstrate the curing of thin coatings of curable compositions. For EX-5 through EX-9 and CE-19 through CE-23, the components and ratios indicated in Table 5, below, were added to an amber bottle. The mixture was mixed on a roller mixer for 24 h and then coated onto the polyimide film using a coating bar gate with a nominal coating thickness of 30 mil (762 µm). The coated film was placed in a fume hood for 30 min and was then put in an oven for 10 min at 60° C. to evaporate solvents, forming an uncured coating. The uncured coating was exposed to actinic radiation using a UV-Web equipped with an UV mercury lamp with D-bulb at 100% power, available under the trade designation "F600" from Heraeus, Hanau, Germany, for five passes at 10 ft/min (3.0 m/min) under an $N_2$ purge during which the $O_2$ concentration was measured to be 30±5 ppm, for a total UV-exposure time of 30 seconds. The cured coating was peeled off the polyimide, and then tested by the Gel Test described above. For EX-9, the procedure described was followed, with the exception that no $N_2$ purge was used during the exposure to the actinic radiation.

TABLE 5

| Purge | $N_2$ purge | | | | | | | No Purge |
|---|---|---|---|---|---|---|---|---|
| | EX-5 | EX-6 | CE-19 | CE-20 | CE-21 | CE-22 | CE-23 | EX-7 |
| Fluoropolymer 2 | 28.3 | | 30 | 29.3 | 29.3 | 29.0 | 23.7 | |
| Fluoropolymer 3 | | 22.6 | | | | | | 22.6 |
| PFA 6502TAZ | | 6.8 | | | | | | 6.8 |
| TAIC ≥98% | 0.7 | 0.6 | | 0.7 | | 0.7 | 0.6 | 0.6 |
| DBPH 90% | 0.7 | 0.1 | | | 0.7 | | | 0.1 |
| IRGACURE 819 | 0.3 | 0.1 | | | | 0.3 | 0.2 | 0.1 |
| ZnO | | | | | | | 0.7 | |
| CaSO4 | | | | | | | 4.7 | |
| MEK | 63 | 70 | 63 | 63 | 63 | 63 | 63 | 70 |
| MeOH | 7 | | 7 | 7 | 7 | 7 | 7 | |
| Percent Gel | 70 | 95 | 0 | 0 | 0 | 68 | 78 | 80 |

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. A curable composition comprising:
    (a) an amorphous fluoropolymer having an iodine, bromine and/or nitrile cure site;
    (b) a peroxide cure system comprising a peroxide and a Type II coagent; and
    (c) a photoinitiator,
    wherein the curable composition is substantially free of a binder material.

2. The curable composition of claim 1, wherein the curable composition is substantially free of an unsaturated metal coagent.

3. The curable composition of claim 1, wherein the amorphous fluoropolymer is partially fluorinated.

4. The curable composition of claim 1, wherein the absorbance profile of the peroxide does not substantially interfere with the absorbance profile of the photoinitiator.

5. The curable composition of claim 1, wherein the peroxide cure system consists essentially of a peroxide and a Type II coagent.

6. The curable composition of claim 1, wherein curable composition is substantially free of polymerizable acrylate, polymerizable methacrylate, or combinations thereof.

7. The curable composition of claim 1, wherein the binder material has a molecular weight of less than 5,000 g/mol.

8. The curable composition of claim 1, wherein the photoinitiator is at least one of 2-benzyl-2-dimethylamino-1-(4-morpholinophenyl)-butanone-1, phenyl bis(2,4,6-trimethyl benzoyl) phosphine oxide, diphenyl (2,4,6-trimethylbenzoyl) phosphine oxide, and bis (eta 5-2,4-cyclopentadien-1-yl) bis [2,6-difluoro-3-(1H-pyrrol-1-yl) phenyl]titanium.

9. The curable composition of claim 1, wherein the photoinitiator comprises a photosensitizer, and at least one of an iodonium salt or an electron donor.

10. A cured composition derived from the curable composition according to claim 1.

11. A method of UV-curing a fluoroelastomer, the method comprising:
    exposing the curable composition according to claim 1 to actinic radiation.

12. A method of dual curing an amorphous fluoropolymer, the method comprising:
    exposing the curable composition according to claim 1 to actinic radiation to form a partially cured composition; and
    exposing the partially cured composition to a heat source wherein the peroxide is not benzoyl peroxide.

13. A method of making a shaped article, the method comprising:
    exposing the composition of claim 1 to actinic radiation to partially cure the composition to form a shaped article; and
    exposing the shaped article to heat source to further cure the shaped article.

14. A method of producing a fluoropolymer article comprising subjecting the curable composition according to claim 1 to additive processing in an additive processing device containing at least one actinic radiation source.

15. A curable composition consisting essentially of:
an amorphous fluoropolymer having an iodine, bromine and/or nitrile cure site;
a peroxide cure system comprising a peroxide and a Type II coagent;
a photoinitiator, and
optionally, an additive selected from the group consisting of an inorganic filler, a carbon particle, a high temperature plastic, or an acid acceptor.

16. The curable composition of claim 1, wherein the amorphous fluoropolymer comprises at least one of a carbon-carbon double bond, or a unit capable of forming carbon-carbon double bonds along the amorphous fluoropolymer chain.

17. The curable composition of claim 1, wherein the amorphous fluoropolymer comprises at least 0.1 wt % of an iodine, bromine and/or nitrile cure site.

18. The curable composition of claim 1, wherein the amorphous fluoropolymer is a copolymer of (i) hexafluoropropylene, tetrafluoroethylene, and vinylidene fluoride; (ii) hexafluoropropylene and vinylidene fluoride, (iii) vinylidene fluoride and perfluoromethyl vinyl ether, (iv) vinylidene fluoride, tetrafluoroethylene, and perfluoromethyl vinyl ether, (v) vinylidene fluoride, tetrafluoroethylene, and propylene, or (vi) ethylene, tetrafluoroethylene, and perfluoromethyl vinyl ether, and (vii) blends thereof.

19. The curable composition of claim 1, wherein the curable composition comprises at least 0.1 peroxide per 100 parts of the amorphous fluoropolymer.

20. The curable composition of claim 1, wherein the Type II coagent comprises at least one of diallyl ether of glycerin, triallylphosphoric acid, diallyl adipate, diallylmelamine and triallyl isocyanurate, tri(methyl)allyl isocyanurate, tri(methyl)allyl cyanurate, poly-triallyl isocyanurate, and xylylene-bis(diallyl isocyanurate).

* * * * *